(12) United States Patent
O'Brien et al.

(10) Patent No.: US 6,470,343 B1
(45) Date of Patent: Oct. 22, 2002

(54) METHOD, COMPUTER PROGRAM PRODUCT, SYSTEM, AND DATA STRUCTURE FOR DATABASE DATA MODEL EXTENSION

(75) Inventors: William O'Brien, Twickenham; Jan Aage Pedersen, Maidenhead, both of (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/237,991

(22) Filed: Jan. 26, 1999

(30) Foreign Application Priority Data

Feb. 20, 1998 (GB) .............................. 9803503

(51) Int. Cl.[7] .............................. G06F 17/30
(52) U.S. Cl. .................. 707/100; 707/104; 707/10; 707/6; 707/200
(58) Field of Search .............. 707/103, 2, 511, 707/505, 1, 100, 6, 10, 104.1, 200, 509

(56) References Cited

U.S. PATENT DOCUMENTS

| | | | |
|---|---|---|---|
| 5,615,367 A | * | 3/1997 | Bennett et al. .............. 395/613 |
| 5,694,608 A | * | 12/1997 | Shostak ....................... 395/767 |
| 5,701,466 A | * | 12/1997 | Yong et al. |
| 5,717,924 A | * | 2/1998 | Kawai |
| 5,734,887 A | * | 3/1998 | Kingberg et al. ........... 395/604 |
| 5,819,086 A | * | 10/1998 | Kroenke |
| 5,893,125 A | * | 4/1999 | Shostak ....................... 707/511 |
| 5,943,665 A | * | 8/1999 | Guha ............................. 707/2 |
| 5,974,430 A | * | 10/1999 | Mutschler, III et al. ..... 707/505 |
| 6,003,039 A | * | 12/1999 | Barry et al. ................. 707/103 |
| 6,078,925 A | * | 6/2000 | Anderson et al. ........... 707/103 |
| 6,108,659 A | * | 8/2000 | Vincent ....................... 707/101 |
| 6,125,363 A | * | 9/2000 | Buzzeo et al. .............. 707/100 |

* cited by examiner

*Primary Examiner*—Kim Vu
*Assistant Examiner*—Tam Nguyen
(74) *Attorney, Agent, or Firm*—Fay, Sharpe, Fagan, Minnich & McKee, LLP

(57) ABSTRACT

A conventional database management system (DBMS) is adapted to store information in a data model having one or more core entities, each core entity including one or more core attributes and being adapted to store core objects having the core attributes. The DBMS according to the invention includes a set of generic tables (FIG. 3) adapted to store extended data model data. The set of tables includes: a new attribute definition table (MEM Column) for associating a new attribute with an existing table; a new data table (MEM Data) for storing new attribute values for core objects; a new entity table (MEM Table) for associating a system identifier with a new entity name, the new attribute definition table being adapted to associate a new attribute with a new entity and the new data table being adapted to store new attribute values for new entity objects.

33 Claims, 4 Drawing Sheets

Well

(a)

| Well Name (C_ID#1) | Spud_Date | Owner |
|---|---|---|
| 104a/2-3 | 01-02-1998 | Shell (O_ID#1) |
| 100b/1 | 03-04-1985 | Mobil (O_ID#2) |
| | 05-06-1980 | Arco (O_ID#3) |

MEM Table

(b) 301

| MEM Table ID | Owner ID | Table Name |
|---|---|---|
| T_ID#2 | O_ID #1 | Well Cost |

MEM Relationship

(c) 302

| Core Table ID | Core Column ID | MEM Table ID | MEM Column ID |
|---|---|---|---|
| Core Table #1 | C_ID#1 | T_ID#2 | C_ID#2 |

MEM Column

(d)

| Table ID | MEM Column ID | MEM Column Name | Data Type |
|---|---|---|---|
| T_ID#2 | C_ID#2 | Well Name | DT_ID#1 |
| T_ID#2 | C_ID#3 | Date | DT_ID#2 |
| T_ID#2 | C_ID#4 | Cost | DT_ID#3 |

MEM Data

(e)

| ROW ID | Table ID | MEM Column ID | Data Value |
|---|---|---|---|
| R_ID#1 | T_ID#2 | C_ID#2 | 104a/2-3 |
| R_ID#1 | T_ID#2 | C_ID#3 | 06-03-1995 |
| R_ID#1 | T_ID#2 | C_ID#4 | 350,000 |
| R_ID#2 | T_ID#2 | C_ID#2 | 104a/2-3 |
| R_ID#2 | T_ID#2 | C_ID#3 | 10-09-1996 |
| R_ID#2 | T_ID#2 | C_ID#4 | 4,000,000 |

| Well Name | Spud_Date | Owner | ROW ID |
|---|---|---|---|
| 104a/2-3 | 01-02-1998 | Shell | R_ID#1 |
| 104a/2-3 | 01-02-1998 | Shell | R_ID#2 |

(b)

| ROW ID | Cost |
|---|---|
| R_ID#1 | 350,000 |
| R_ID#2 | 4,000,000 |

(c)

| ROW ID | Date |
|---|---|
| R_ID#1 | 06-03-1995 |
| R_ID#2 | 10-09-1996 |

(d)

| Well Name | Spud_Date | Owner | Cost | Date |
|---|---|---|---|---|
| 104a/2-3 | 01-02-1998 | Shell | 350,000 | 06-03-1995 |
| 104a/2-3 | 01-02-1998 | Shell | 4,000,000 | 10-09-1996 |

Figure 4

METHOD, COMPUTER PROGRAM PRODUCT, SYSTEM, AND DATA STRUCTURE FOR DATABASE DATA MODEL EXTENSION

FIELD OF THE INVENTION

The present invention relates to an extended data model for a database management system (DBMS).

BACKGROUND OF THE INVENTION

FIG. 1 shows a database model, comprising a number of core entities 10. Each core entity 10 is typically a database table comprising a plurality of objects, each object having one or more attributes. Core entities may be related by having attributes in common. In, for example, an oil field database application, although it will be seen that the invention is not limited to this industry, a core entity may be a table including oil well names, each having a well identifier. This core entity may be related to another entity, containing oil well owner information via the well identifier attribute.

Typically, oil field database applications manage vast amounts of information divided into data entities with complex relationships. The market for such large applications is limited to a small number of clients who rely on the software supplier to customise the core application to their requirements, rather than such customisation being carried out by the clients, as is generally the case with low cost high volume applications.

Large applications can include very complex data models and are usually searched using structured query language (SQL) expressions. For more information on the use of structured query language see "A Guide to SQL", Philip J. Pratt, Boyd & Fraser Pub Co, February 1995, ISBN: 0877095205. Search expressions may be quite complex and their results may be relied upon to produce appropriate reports within the database application. It is often the case, that a software supplier will be required to customize an application for one or more clients or even for one or more sites controlled by a single client. Such customization can involve updating and, in particular, extending a data model for the customized application and can be quite complicated and time consuming to complete. For example, the effects of a change in the data model have to be checked against each search and report generated from the data model and vice versa.

Using traditional techniques, software suppliers end up customizing the core application for each client to the extent that they must maintain a different application for each client and each site individually. This makes it difficult to update the core application without affecting its customisations and leads to high development costs, reduced reliability and slower turnaround times which is clearly unacceptable.

There is therefore a requirement for a more generic way of handling small extensions to a data model on an ongoing basis. This would allow client and site-specific extensions necessitating little, if any, intervention from the software supplier, nonetheless these extensions should not affect the core of the application and should leave the supplier free to update the core and make necessary changes to other client applications.

SUMMARY OF THE INVENTION

Accordingly, the present invention provides a database management system (DBMS) adapted to store information in a data model having one or more core entities, each core entity including one or more core attributes and being adapted to store core objects having said core attributes, said DBMS including a set of generic tables adapted to store extended data model data, said tables including a new attribute definition table for associating a new attribute with an existing table and a new data table for storing new attribute values for core objects.

The DBMS according to the invention allows the following types of site-specific extensions: addition of new attributes to an existing database entity; addition of a new entity to the data model with an arbitrary number of attributes; and addition of a relationship between a new entity and another entity.

The DBMS operates on a data model including a generic structure. This generic structure forms pail of the data model delivered to all sites. It is therefore easily supported in data migration between successive versions of the DBMS.

BRIEF DESCRIPTION OF THE DRAWINGS

FIGS. 3(a) to (e) show a sample database generated according to the present invention;

FIGS. 4(a) to (d) show some views used in querying the database of FIGS. 3(a) to (e).

BRIEF DESCRIPTION OF THE PREFERRED EMBODIMENTS

Figure 1:
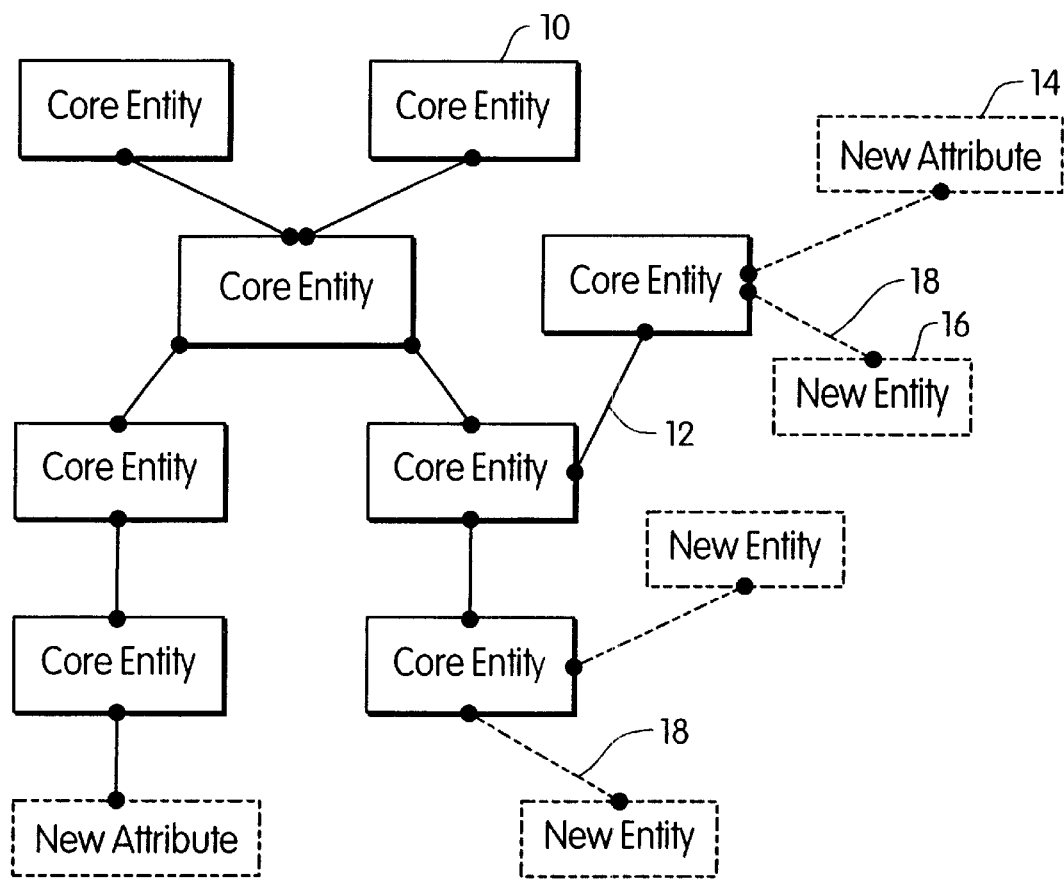
FIG. 1 shows a database data model including some new entries and attributes.

Referring now to FIG. 1, a database application contains a plurality of core entities 10, each related by common attributes indicated by the lines 12. FIG. 3, shows an example core table "Well" including three attributes "Well Name", "Spud Date" and "Owner". Other core entities provide information about the core data model and the allowable owners of extensions to the data model. These reference entities are:

Core Table (Core table ID, Core table name)
Core Column (Core table ID, Core column ID, Core column name)
Owner (Owner ID, Owner name)

In the case of core table "Well", an object for this table is added to Core Table associating a system generated identity, in the example "T_ID#1" with the table name "Well". Each "Well" attribute corresponds with an object in Core Column. In Core Column, each Core column name, for example, "Well Name" is associated with a system generated identity, "C_ID#1", and a Core Table identity, "T_ID#1".

The Owner table allows implementation of a basic level of security ensuring that only authorised users can access the extension dictionary described below. In addition, it ensures that extensions implemented by different vendors do not clash when implemented at the same site.

It is often necessary when customizing such a database application to add new attributes 14 to existing core entities or to add completely new entities 16, linked to existing entities by new relationships 18, FIG. 1.

Conventionally, this is done by adding new attributes to existing core entities or by generating a new database table for each new entity. In a large application, however, this task can be extremely complicated, and have unforseen effects on existing database queries and reports.

Figure 2:
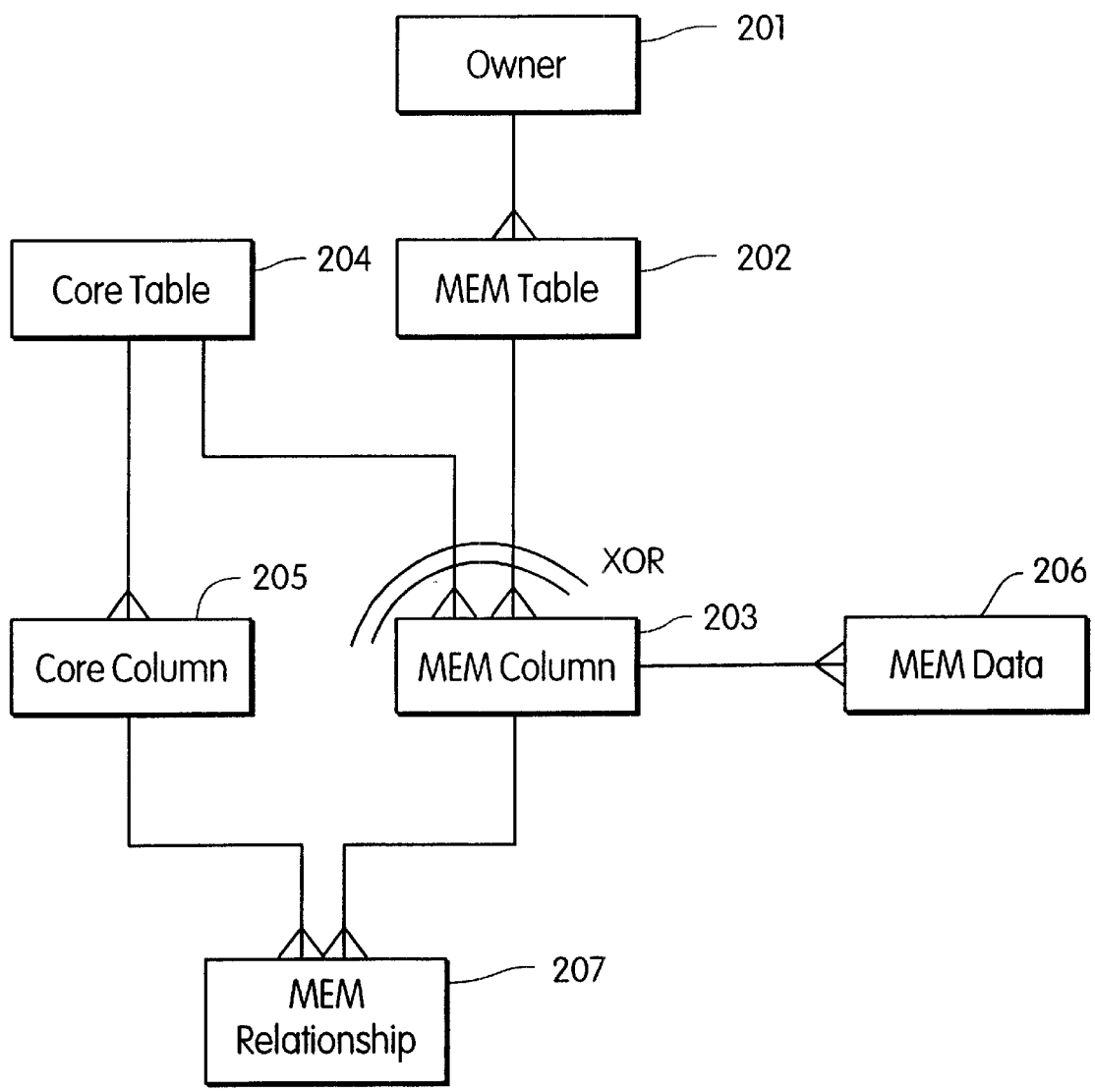
FIG. 2 is a model showing the relationship between core application information and generic structure information.

In the present embodiment, however, the database application data model includes a generic structure comprising four tables, which is used to contain all new entity, attribute and relationship information, as shown in FIG. 2. A number of entities are provided within the generic structure enabling various parties to define extensions to the core data model. These are referred to as dictionary entities:

MEM Relationship (Core table ID, Core column ID, MEM table ID, MEM column ID)

MEM Table (Table ID, Table owner, Table name)

MEM Column (Table ID, Column ID, Column name, Data type)

MEM Data (Row ID, Table ID, Column ID, Value, Unit).

When a user wishes to add a new entity to a data model, the user must first add an object to the table MEM Table. In the example database of FIGS. 3(a) to (e), a new entity called "Well Cost" is added as a row 301 in the MEM Table shown in FIG. 3(b) and this is associated with an Owner via an Owner ID, "O_ID#1", (derived from the Owner table explained above) and allocated a system generated identity "T_ID#2".

If the user simply wishes to add a new attribute to a core entity or to begin to define the attributes of a new entity, the user must then add objects to the table MEM Column. Each object in MEM Column associates a new column name, for example, "Well Name" with a system generated ID, "C_ID#2". The new column is also associated with a table identifier.

In the example database of FIGS. 3(a) to (e), all of the new columns are associated with the new entity "Well Cost" which has an identity "T_ID#2" and are stored in the MEM columns table shown in FIG. 3(d). Finally, the new column is associated with a data type. In the present example, three data types "DT_ID#1" . . . "DT_ID#3" are given. These represent a string, a date and a number respectively. All of these can be stored in ASCII format and can be transformed using the data type attribute, during later processing. The present description does not describe support for binary or array data types although these are not excluded from the scope of the invention.

The user can now specify new relationships between new entities and core entities by adding objects to the MEM Relationship table. In the example database shown in FIGS. 3(a) to (e), the "Well Name" attribute of the "Well Cost" entity is related to the "Well Name" attribute of the core "Well" entity. This is illustrated as a row 302 in the MEM Relationship table shown in FIG. 3(c).

MEM Relationship explicitly relates extended attributes with attributes of core tables and, as such, the present description does not provide for creation of an interrelated structure of additional entities by creating relationships between new entities, although this is not excluded for the scope of the invention. It will be seen that there is no need for MEM Relationship to be adapted to define new relationships between core entities, as this can be done if necessary with the core of the data model.

The relationship between the core reference entities and the dictionary entities is illustrated in FIG. 2. This shows that an Owner object 201 has a one-to-many relationship with a MEM Table 202, that is, one owner may own many extended entities. MEM Column has a many-to-one relationship with both Core Table 204 and MEM Table 202; that is because MEM Column 203 may contain more than one new attribute for any Core entity or any new entity. Core Column 205 has the same type of many-to-one relationship, but only with Core Table 204. Many objects may include any new attribute and so MEM Data 206 has a many-to-one relationship with MEM Column 203. Any number of Core attributes can be associated with any number of extended attributes, and so MEM relationship 207 has a many-to-one relationship with both Core Column 205 and MEM Column 203. As explained earlier, it will be seen that this aspect of the embodiment could be adapted to allow new relationships to be defined between new entities.

It will be seen that because a user only has to add information to the same four tables to define any new entity and its owner, new attributes for new or core entities, and new data in the new attributes, simple data maintenance or input forms can be designed to manage extensions to the data model.

When a user wishes to define a new entity, they simply need to provide the entity name and its owner via a first form. When a user wishes to define a new attribute, they simply need to provide the attribute name, its data type, and the name of the entity it belongs to via another form or a second part of the first form. When a user wishes to add data, the only need to specify the entity the data is to be added to and provide the data value via another form or again another part of the first form. It is a simple procedure to determine the list of attributes for the entity and to add the appropriate number of objects to MEM data.

In order to select information stored in MEM Data rows, one has to build one or more dynamic SQL sentences based on the MEM tables. Any SQL sentence which requires a view on a core entity needs to take into account that the core entity may have extended attributes. Thus, the SQL sentence may need to include a view on the MEM Data table. The problem, however, is that extended attributes for an object are stored on different rows in MEM Data and any view needs to be able to associate multiple extended attributes with the same object. The present embodiment solves this problem by taking a multi-stage approach to joining MEM Data with a core table or joining attributes for a new entity. The key to this is the use of the MEM Data ROW ID attribute to link a set of extended attributes.

In the example database of FIGS. 3(a) to (e), because a new entity, Well Cost, is involved, MEM Relationship (FIG. 3(a)) needs to be queried first to determine which attribute the extended table Well Cost shares with the core table Well. In the present example, MEM Relationship tells us that if we wish to extract information from Well and Well Cost, we can join MEM Data and Well, by restricting to MEM Column ID=C_ID#2, and projecting the view to include the ROW ID attribute as well as the core table attributes. If we want to see information for Well Name="104a/2–3", a first SQL sentence would therefore be:

Well join Well Cost [Well Name, Spud_Date, Owner, ROW ID] where MEM COLUMN ID="C_ID#2" and Data Value="104a/2–3" to produce an intermediate view as shown in FIG. 4(a), although this would not be instantiated. The ROW ID attribute of this view operates as a key into MEM DATA enabling the view to be joined with other views. Thus, if we wish to see all attributes of Well Name="104a/2–3", further SQL sentences can be used:

MEM Data [ROW ID, Data Value]

where MEM COLUMN ID="C_ID#3" produces the view of FIG. 4(b), and:

MEM Data [ROW ID, Data Value]

where MEM COLUMN ID="C_ID#4" produces the view of FIG. 4(c).

Each of these three component views can be joined, and the result restricted to where ROW ID attributes from the component views match and without projecting the ROW ID attribute, to produce the view of FIG. 4(d). In FIG. 4(d), the additional attributes are associated with the correct object as required. This is the view which is instantiated to return a result to a calling program.

The views above have been described separately for clarity, although it will be seen that in at least some cases, views can be integrated into a single view to produce a required result.

The security to be applied to the data values contained in the extended tables does not form part of the current disclosure, although it will be seen that any information returned from a query can be restricted according whether or not the identity of a person querying the database matches the Owner ID stored in the core Well table and/or MEM Table.

As will be understood by one of ordinary skill in the art, computer programs such as that described herein are typically distributed as part of a computer program product that has a computer readable medium containing the program code. Examples of a computer readable medium include but are not limited to palpable physical media, such as a CD Rom, diskette, hard drive and the like, as well as other non-palpable physical media, such as a carrier signal when the program is distributed electronically.

While the preferred embodiment of the present invention has been described in detail, it will be understood that modification and adaptations to the embodiment may occur to one of skill in the art without departing from the scope of the present invention as set forth in the following claims.

What is claimed is:

1. In a database management system ("DBMS") that stores information in a core data model having one or more core entities, each core entity including one or more core attributes, a method for making a customized extension to the core data model that allows modification of the one or more core entities without requiring changes to the customized extension, the method comprising:
   providing a generic structure which is adapted to define the customized extension to the core data model;
   said generic structure being a part of the core data model;
   configuring the core data model so that said customized extension is not affected when the one or more core entities are changed;
   storing, in the generic structure, information associating at least one new attribute with an existing core entity of the core data model; and
   storing, in the generic structure, values for the at least one new attribute of the core entity;
thereby extending the core data model in a manner that allows the one or more core entities to be modified without affecting the customized extension to the core data model.

2. A method as recited in claim 1 wherein the generic structure is a database table.

3. In a database management system ("DBMS") that stores information in a core data model having one or more core entities, each core entity including one or more core attributes, a method for making a customized extension to the core data model that allows modification of the one or more core entities without requiring changes to the customized extension, the method comprising:
   providing a set of generic tables that are adapted to define the customized extension to the core data model;
   said generic tables being part of the core data model;
   configuring the core data model so that said customized extension is not affected when the one or more core entities are changed; and
   storing in the set of generic tables information relating to the extended data model including:
   storing, in a new attribute table, information associating a new attribute with an existing table of the core data model; and
   storing, in a new data table, values for the new attributes of the core entity;
thereby extending the core data model in a manner that allows the one or more core entities to be modified without affecting the customized extension to the core data model.

4. A method as recited in claim 3 further comprising:
   storing, in a new entity table, information associating a system identifier with a new entity name;
   storing, in the new attribute table, information associating a new attribute with a new entity; and
   storing, in the new data table, new attribute values for the new entity objects;
thereby extending the core data model to include new entities in a manner that allows the one or more core entities to be modified without affecting the customized extension to the core data model.

5. A method as recited in claim 4 wherein the new entity table includes an owner attribute for associating an owner identifier with a new entity.

6. A method as recited in claim 3 further comprising storing, in a new relationship table, information associating a new attribute with a core attribute.

7. A method as recited in claim 3 further comprising at least one maintenance form adapted to enable a user to create and maintain the set of generic tables.

8. A method as recited in claim 3 further comprising storing, in the new data table, a row attribute adapted to link a set of new attribute values to a core entity object.

9. A method as recited in claim 3 further comprising storing, in the new data table, a table identifier attribute adapted to link a new attribute value to a core entity object.

10. A method as recited in claim 4 further comprising storing, in the new data table, a row attribute adapted to link a set of new attribute values to a core entity object.

11. A method as recited in claim 4 further comprising storing, in the new data table, a table identifier attribute adapted to link a new attribute value to a core entity object.

12. A method as recited in claim 3 further comprising storing, in the new data table, a new attribute identifier attribute adapted to link a new attribute value to a new attribute.

13. A computer program product comprising:
   a computer usable medium;
   computer readable instructions embodied in said computer readable medium for use in a database management system ("DBMS") that stores information in a core data model having one or more core entities, each core entity including one or more core attributes;
   the computer readable instructions making a customized extension to the core data model in a manner that allows modification of the one or more core entities without requiring changes to the customized extension; and
   the computer readable instructions directing a computer to perform the steps of:
   storing in a set of generic tables that are part of the core data model information relating to the extended data model including:
   storing, in a new attribute table, information associating a new attribute with an existing table of the core data model; and
   storing, in a new data table, values for the new attributes of the core entity;
thereby extending the core data model in a manner that allows the one or more core entities to be modified without effecting the customized extension to the core data model.

14. A computer program product as recited in claim 13 further comprising instructions directing a computer to perform the steps of:
   storing, in a new entity table, information associating a system identifier with a new entity name;
   storing, in the new attribute table, information associating a new attribute with a new entity; and
   storing, in the new data table, new attribute values for the new entity objects;
thereby extending the core data model to include new entities in a manner that allows the one or more core entities to be modified without affecting the customized extension to the core data model.

15. A computer program product as recited in claim 14 wherein the new entity table includes an owner attribute for associating an owner identifier with a new entity.

16. A computer program product as recited in claim 13 further comprising instructions directing a computer to perform the step of storing, in a new relationship table, information associating a new attribute with a core attribute.

17. A computer program product as recited in claim 13 further comprising instructions directing a computer to perform the steps of providing at least one maintenance form adapted to enable a user to create and maintain the set of generic tables.

18. A computer program product as recited in claim 13 further comprising instructions directing a computer to perform the step of storing, in the new data table, a row attribute adapted to link a set of new attribute values to a core entity object.

19. A computer program product as recited in claim 13 further comprising instructions directing a computer to perform the step of storing, in the new data table, a table identifier attribute adapted to link a new attribute value to a core entity object.

20. A computer program product as recited in claim 14 further comprising instructions directing a computer to perform the step of storing, in the new data table, a row attribute adapted to link a set of new attribute values to a core entity object.

21. A computer program product as recited in claim 14 further comprising instructions directing a computer to perform the step of storing, in the new data table, a table identifier attribute adapted to link a new attribute value to a core entity object.

22. A computer program product as recited in claim 13 further comprising instructions directing a computer to perform the step of storing, in the new data table, a new attribute identifier attribute adapted to link a new attribute value to a new attribute.

23. A database management system (DBMS) adapted to store information in a core data model of a core application, the core data model having one or more core entities, each core entity including one or more core attributes and being adapted to store core objects having said core attributes, said DBMS including;
   a set of generic tables adapted to store extended data model data for making a customized extension to the core data model that allows modification to the one or more core entities without requiring changes to the customized extension, said set of generic tables being part of said data model, said set of generic tables including;
      a new attribute definition table configured to associate a new attribute with an existing table; and
      a new data table which stores new attribute values for core objects;
   thereby extending the core data model to allow the one or more core entities to be modified without affecting the customized extension to the core data model.

24. A DBMS as claimed in claim 23 wherein said set of generic tables includes a new entity table for associating a system identifier with a new entity name, said new attribute definition table being adapted to associate a new attribute with a new entity and said new data table being adapted to store new attribute values for new entity objects.

25. A DBMS as claimed in claim 24 wherein said new entity table includes an owner attribute for associating an owner identifier with a new entity.

26. A DBMS as claimed in claim 23 wherein said set of generic tables includes a new relationship table for associating a new attribute with a core attribute.

27. A DBMS as claimed in claim 23 comprising a data model extension manager comprising one or more maintenance forms adapted to enable a user to create and maintain the set of generic tables.

28. A DBMS as claimed in claim 23 wherein said new data table includes a row attribute adapted to link a set of new attribute values for a core entity object.

29. A DBMS as claimed in claim 23 wherein said new data table includes a table identifier attribute adapted to link a new attribute value to a core entity.

30. A DBMS as claimed in claim 24 wherein said new data table includes a row attribute adapted to link a set of new attributes for a new entity object.

31. A DBMS as claimed in claim 24 wherein said new data table includes a table identifier attribute adapted to link a new attribute value to a new entity.

32. A DBMS as claimed in claim 23 wherein said new data table includes a new attribute identifier attribute adapted to link a new attribute value to a new attribute.

33. In a database management system ("DBMS") that stores information in a core data model having one or more core entities, each core entity including one or more core attributes, a set of database tables on a computer readable medium that are part of the core data model, the set of tables configured to make a customized extension to the core data model, the set of tables comprising:
   a new entity table that defines a new entity extension to the core data model and includes values for a new entity ID, an owner ID, and a table name for each new entity entry recorded therein;
   a relationship table that defines a relationship between a new entity and a core entity, and includes values for a core entity ID, a core entity column ID, a new entity ID, and a new entity column ID for each new relationship entry recorded therein with the core entity column ID and the new entity column ID used to identify columns to be joined;
   a column table that defines an extended column definition, and includes values for a new entity ID, a column ID, a column name, and a new data type for each column entry recorded therein, the extended column being a new attribute; and
   a new data table that defines new data added to the customized extension, and includes values for a row ID, a new entity ID, a column ID, and associated data for each new data entry recorded therein, the associated data being a new attribute value for the new attribute defined by a column table entry referenced by the column ID and part of the new entity identified by a new entity ID.

* * * * *